United States Patent [19]

Hong et al.

[11] Patent Number: 5,541,017
[45] Date of Patent: *Jul. 30, 1996

[54] METHOD FOR MAKING HIGH CAPACITY RECHARGEABLE HYDRIDE BATTERIES

[76] Inventors: Kuochih Hong, 1790 Rollingwoods, Troy, Mich. 48098; Kuoshiu Hong, 10F, No. 8, Li-Nung Street, Sec. 1, Taipei, Taiwan; Huiyim Hong, 4F, No. 9, 32 Nung, Alley 189, Cheng-Tai Road, Sec. 1, Wu-Ku Hsiang, Taipei Hsien, Taiwan; Kuoping Hong, No. 15, Alley 146, Chung-ching South Road, Sec. 3, Taipei, Taiwan

[*] Notice: The term of this patent shall not extend beyond the expiration date of Pat. No. 5,501,917.

[21] Appl. No.: 212,354

[22] Filed: Mar. 14, 1994

Related U.S. Application Data

[63] Continuation-in-part of Ser. No. 189,080, Jan. 28, 1994, Pat. No. 5,501,917.

[51] Int. Cl.$^6$ .................................................. H01M 4/38
[52] U.S. Cl. ............................ 429/59; 429/101; 429/218; 429/219; 429/223; 429/224; 429/233; 420/455; 420/900; 423/644; 29/623.1; 29/623.5
[58] Field of Search ............................ 429/59, 101, 218, 429/219, 223, 224, 233; 420/455, 900; 423/644; 29/623.1, 623.5

[56] References Cited

U.S. PATENT DOCUMENTS

| | | |
|---|---|---|
| 3,660,082 | 5/1972 | Negishi et al. . |
| 4,160,014 | 7/1979 | Gamo et al. . |
| 4,195,989 | 4/1980 | Gamo et al. . |
| 4,370,163 | 1/1983 | Moriwaki et al. . |
| 4,431,561 | 2/1984 | Ovshinsky . |
| 4,440,736 | 4/1984 | Maclano et al. . |
| 4,457,891 | 7/1984 | Bernauer et al. . |
| 4,551,400 | 11/1985 | Sapru et al. . |
| 4,623,597 | 11/1986 | Sapru et al. . |
| 4,716,088 | 12/1987 | Reichman et al. . |
| 4,728,586 | 3/1988 | Venkatesan . |
| 4,849,205 | 7/1989 | Hong . |
| 4,946,646 | 8/1990 | Gamo et al. .................... 420/415 |
| 5,006,328 | 4/1991 | Hong . |
| 5,096,667 | 3/1992 | Fetcenko .................... 420/580 |
| 5,104,617 | 4/1992 | Fetcenko et al. . |
| 5,238,756 | 8/1993 | Fetcenko . |
| 5,242,656 | 9/1993 | Zhang et al. .................... 420/417 |
| 5,354,576 | 10/1994 | Zhang et al. .................... 429/59 |
| 5,358,800 | 10/1994 | Zhang et al. .................... 429/59 |

*Primary Examiner*—M. Nuzzolillo

[57] ABSTRACT

A method to make new improved high capacity rechargeable hydride batteries comprising steps of (1) preparing an improved hydrogen storage material represented by the composition formula: $A_aB_bNi_cD_yM_xR_z$, where A is one or more element chosen from the group of Ti, Zr, Mg; B is one or more elements chosen from the group of Al, V, Mn, Nb, Si, Pd, and Ag; D is one or more elements chosen from the group of Cr, Mn, Fe, Co, Cu, Zn, Mo, W and Sn; R is one or more elements chosen from the group of C, B, Ca, Sb, Bi, Y, Hf, Ta, N, O, Ge, Ga and Mm, where Mm is mischmetal; M is one or more elements chosen from the group of Li, Na, K, Rb, Cs, P and S; and where a, b, c, y, x and z are defined by: $0.10 \leq a \leq 0.85$, $0.01 \leq b \leq 0.65$, $0.02 \leq c \leq 0.75$, $0 \leq y \leq 0.30$, $0 \leq x \leq 0.30$, $0 \leq z \leq 0.30$ and $a+b+c+y+x+z = 1.00$; (2) preparing a high capacity (1.15–2.4 AH/cc) hydrogen storage hydride electrode comprising the alloy material aforementioned; (3) preparing a high capacity (0.45–0.75 AH/cc) metal oxide positive electrode; (4) assembling a rechargeable hydride battery.

32 Claims, 1 Drawing Sheet

METHOD FOR MAKING HIGH CAPACITY RECHARGEABLE HYDRIDE BATTERIES

CROSS-REFERENCE TO RELATED APPLICATIONS

This application is a continuation in part application of application Ser. No. 08/189,080, filed on Jan. 28, 1994, now U.S. Pat. No. 5,501,917.

BACKGROUND OF THE INVENTION

1. Field of the Invention

This invention relates to rechargeable hydride batteries. More particularly, the invention discloses a method to make improved high capacity rechargeable batteries comprising a metal oxide-hydride couple in which the negative electrode is made of an improved hydride/hydrogen storage electrode.

2. The Related Art

Sapru et. al. in U.S. Pat. No. 4,551,400 and Rechman et al. in U.S. Pat. No. 4,716,088 reported a rechargeable hydride battery using pseudo $TiV_2$-type hydrogen storage alloy as the active material of the negative electrode. Their alloys, Ti—V—Ni, Ti—Zr—V—Ni and Ti—Cr—V—Ni have short cycle life, high self-discharge rate, and/or are very difficult to activate. U.S. Pat. Nos. 4,728,586, 5,096, 667, 5,104,617, and 5,238,756 disclose a Ti—Zr—V—Ni—Cr— based alloy for hydride electrode. This kind of alloy still has some weaknesses. The alloy disclosed in these patents contains Ti+Zr from 16.5 at. % to 37.9 at. % and V+Ni from 34.8 to 70. 98 at. %. As a result, as given in their examples, the alloys disclosed contain a substantial amount of vanadium metal which is very expensive and still has a high corrosion rate in an alkaline medium. Consequently, the cell made by a conventional method still has high internal pressure during overcharge and cycle life is shortened. Treatment with alkaline etching will not be able to solve the intrinsic fundamental weakness of these alloys. Moreover, the corrosion leads to the formation of an oxide layer and low surface area. This does not result in reduced self discharge. In contrast, it leads to poor charging efficiency, poor rate capability and higher internal pressure in a sealed cell. These patents do not disclose a method to prepare a hydride cell using the alloy disclosed. More importantly, these prior arts do not teach how to fabricate a workable rechargeable cell using the alloy thereof. Consequently their "sample" cells have poor capacity and poor cycle life as shown in these patents.

U.S. Pat. Nos. 4,849,205, 4,946,646 and 5,006,328 disclosed hydride storage electrode alloys and suggested the use of the alloy to be used in an electrochemical cell. However, little or no information was given regarding how to fabricate a workable rechargeable electrochemical cell using these alloys.

More recently, U.S. Pat. No. 5,242,656 issued on Sep. 7, 1993, to Zhang et al, Zhang discloses a hydride battery using a $CaNi_5$-type alloy, $MmNi_{5-x-y-z-u}A_xB_yC_zD_u$, where Mm is mischmetal, A=Mn, Sn, or V; B=Cr, Co, Ti, Zr, or Si; C=Al, Mg, or Ca; D=Li, Na, or K; and $0<x<0.95$, $0<y<1$, $0<z<0.7$, $0.1<u<0.9$; or a ternary ally, $Ti_2Ni_{1-u}D_u$, where D=Li, Na, or K; and $0.04<u<0.9$. Zhang claimed their materials have a better result. However, the use of mischmetal which is a mixture of rare earth metals and the $CaNi_5$ structure, limits the availability of the raw material source and alloy selection. Furthermore, rare earth metals are very sensitive to oxygen and moisture, and the alloys have high corrosion rates. Therefore, the preparation process requires a lot of precautions and a handful of procedures. Moreover, the capacity of the alloy is not high. On the other hand, the use of $Ti_2Ni$ with a modifier of Li, Na or K to partially replace Ni has even more weakness. It is not easy to introduce Li, Na or K into $Ti_2Ni$ body, thus the alloy is still not easy to activate and the cycle life will drop drastically after these alkali metals dissolve in alkaline solution. Furthermore, the introduction of alkali metals, especially Li into $Ti_2Ni$, only results in a more stable hydride. The rate capability and usable capacity are very poor.

To solve these problems, the present invention discloses a method to make a newly improved hydride battery using an improved hydrogen storage/hydride electrode.

SUMMARY OF THE INVENTION

The present invention discloses a method to make new improved high capacity rechargeable metal oxide-hydride batteries, and in particular, rechargeable nickel-hydride batteries.

The battery, according to this invention, is composed of a container, a high capacity positive electrode, a high capacity negative electrode comprising a body of rechargeable hydrogen storage active material and/or its hydride, a separator positioned between the positive and negative electrodes; and an electrolyte in the container and in contact with the positive and negative electrodes and the separator.

The negative electrode is composed of a hydrogen storage alloy having a composition represented by:

$$A_aB_bNi_cD_yM_xR_z$$

where Ni is the element nickel and other components A, B, D, M and R are defined by: A is one or more elements selected from the group consisting of: Ti, Zr, Mg; B is at least one element selected from the group consisting of: Al, V, Mn, Nb, Si, Pd and Ag; D is at least one element selected from the group consisting of: Cr, Mn, Fe, Co, Cu, Zn, Mo, W and Sn; R is at least one element selected from the group consisting of: C, B, Ca, Sb, Bi, Sc, Y, Hf, Ta, N, O, Ge, Ga and Mm, where Mm is a mischmetal which is a mixture of rare earth metals; M is at least one element selected from the group consisting of Li, Na, K, Rb, Cs, P and S; where a, b, c, x, y and z are defined by: $0.10 \leq a \leq 0.85$, $0.01 \leq b \leq 0.65$, $0.02 \leq c \leq 0.75$, $0 \leq y \leq 0.30$, $0 \leq x \leq 0.30$, $0 \leq z \leq 0.30$, $a+b+c+y+x+z=1.00$, and the atomic mole ratio of Ti is not greater than a, but is greater than zero; and if present, MM is 0–8.0 at. %, O is 0–2.0 at %, Mn is 0–15 at. %; preferably, $0.40 \leq a \leq 0.65$, $0.02 \leq b \leq 0.40$, $0.10 \leq c \leq 0.45$, $0 \leq y \leq 0.15$, $0 \leq x \leq 015$, $0 \leq z \leq 0.15$; also preferably, Zr is less than 30 at. % and/or $0.07 \leq y+z \leq 0.15$, if present.

Alternatively, the negative electrode is composed of a hydrogen storage alloy having a composition represented by: $A_aB_bNi_cD_yQ_pM_xR_z$ and its hydride thereof; where Ni, is nickel and other components A, B, D, Q, M and R are defined by: A is at least one element selected from the group consisting of Ti, Zr and Mg; B is at least one element selected from: V, Mn and Cr; Q is at least one element selected from the group consisting of Fe, Co, Cu, Zn, Nb, Mo, W, Pd, Ag, and Sn; M is at least one element selected from the group consisting of Li, Na, K, Rb, Cs, P and S; R is at least one element selected from the group consisting of C, B, Ca, Sb, Bi, Sc, Y, Hf, Nb, Ta, N, O, Ge, Ga and Mm where Mm is the mischmetal; and the atomic mole ratios a, b, c, y, p, x and z are defined by: $0.10 \leq a \leq 0.85$, $0.01 \leq b \leq 0.65$, $0.02 \leq c \leq 0.75$; $0 \leq y \leq 0.30$, $0 \leq p \leq 0.30$, $0 \leq x \leq 0.30$; $0 \leq z \leq 0.30$ and the atomic mole ratio of Ti is not greater than a, but is greater than zero; $a+b+c+y+p+x+z=1.00$, and if present, O is 0–2.0 at. %, Mm is 0–8.0 at. %, Mn is 0–15 at. %, and Al is between 3.0 and 30 at. %; preferably $0.40 \leq a \leq 0.65$, $0.02 \leq b \leq 0.40$, $0.10 \leq c \leq 0.45$; $0 \leq y 0.15$; $0 \leq p \leq 0.15$; $0 \leq x \leq 0.15$, $0 \leq z \leq 0.15$; another preferably, $0.20 \leq a \leq 0.65$, $0 \leq y \leq 0.15$, $0.10 \leq b+c \leq 0.30$, $0 \leq p \leq 0.15$, $0 \leq x \leq 0.15$, $0 \leq z \leq 0.15$; further preferably, Zr is less than 30 at. % and/or $0.07 \leq p+z$.

Alternatively further, the negative electrode is composed of a body of a multicomponent hydrogen storage alloy selected from the groups having compositions represented by: $(Ti, Zr)_a(V, Mn) Ni_c Mo_y Q_p M_x R_z$ and its hydride thereof; $(Ti, Zr)_a(Nb, Mn)_b Ni_c (Cr, Mo)_y Q_p M_x R_z$ and its hydride thereof; $(Ti, Hf)_a(V, Mn)_b Ni_c Mo_y Q_p M_x R_z$ and its hydride thereof; $(Ti, Zr)_a(V, Mn)_b Ni_c (Cr, Mo)_y Q_p M_x R_z$ and its hydride thereof; where Q is at least one element selected from the group consisting of Al, Mg, Ca, Si, Co, Fe, Cu, Zn, W, Pd, Ag, Nb and Sn; M is at least one element selected from the group consisting of Li, Na, K, Rb, Cs, P and S; R is at least one element selected from the group consisting of Hf, C, B, Sb, Nb, Bi, Sc, Y, Ta, N, O, Ge, Ga and Mm, where Mm is mischmetal; and where the atomic mole ratios a, b, c, p, x, y and z are defined by: $0.10 \leq a \leq 0.85$, $0 \leq b \leq 0.45$, $0.02 \leq c \leq 0.75$, $0 \leq y \leq 0.30$, $0 \leq p \leq 0.30$, $0 \leq x \leq 0.30$, $0 \leq z \leq 0.30$, $0 < b+y < 0.65$; $a+b+c+p+x+y+z=1.00$, and the atomic mole ratio of Ti is not greater than a, but is greater than zero; the atomic mole ratios of other components are: Ti plus Zr is a, Ti plus Hf is a, Mn plus V is b, Mn plus Nb is b, Cr plus Mo is y; and if present, Mn is 0–15 at. %, Nb is 0–38 at. %, Mn is 0–8.0 at. % and O is 0–2.0 at. %; preferably, $0.30 \leq a \leq 0.65$, $0.02 \leq b \leq 0.40$, $0.10 \leq c \leq 0.45$, $0 < y < 0.15$, $0 \leq p \leq 0.15$, $0 \leq x \leq 0.15$, and $0 \leq z \leq 0.15$; another preferably, $0.40 \leq a \leq 0.65$, $0.02 \leq b \leq 0.40$, $0.10 \leq c \leq 0.45$, $0 \leq x \leq 0.15$, $0 < y < 0.15$, $0 \leq z \leq 0.15$ and $0 < b+c < 0.52$; also preferably Zr is less than 30 at. %.

The positive electrode is composed of a metal oxide, preferably nickel oxide. The separator is composed of a body selected from nylon, and polysulfone. The electrolyte is composed of an alkaline solution. The container is made of either metal or plastic material.

It is the major object of the present invention to provide a high capacity rechargeable nickel-hydride cell, especially a sealed type, using the aforementioned improved hydrogen storage alloy for the negative electrode, wherein as a consequence, the battery so made has high capacity, long cycle life, and low internal pressure during overcharge.

The advantages, features and other objects of the present invention will become clear from the following detailed description.

DETAILED DESCRIPTION OF THE INVENTION

Figure 1:
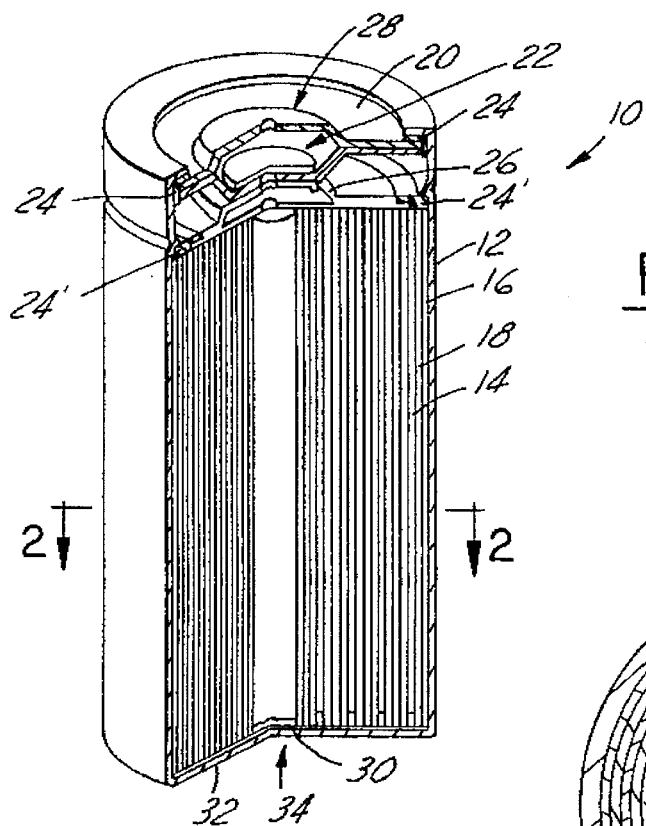
FIG. 1 is a partly sectional perspective view of a battery according to the present invention.

The present invention discloses a method to make an improved rechargeable metal oxide-hydride battery, and in particular, an improved high capacity nickel-hydride battery.

In a nickel-hydride battery, the electrochemical reactions are as follows:

At the positive electrode (Nickel electrode):

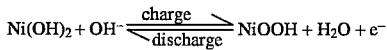

$$Ni(OH)_2 + OH^- \underset{\text{discharge}}{\overset{\text{charge}}{\rightleftarrows}} NiOOH + H_2O + e^-$$

At the negative electrode (hydride electrode):

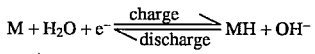

$$M + H_2O + e^- \underset{\text{discharge}}{\overset{\text{charge}}{\rightleftarrows}} MH + OH^-$$

where M and MH are the multicomponent hydrogen storage alloy and its hydride respectively.

During overcharge, water electrolysis will occur. Thus, oxygen will be generated at the positive electrode and hydrogen gas will be generated at the negative electrode. In a sealed cell, if the oxygen gas is not going to recombine with hydrogen, the internal pressure will increase and vent out through the safety valve. But electrolyte will then be lost and cell life is consequently shortened. Other factors, such as poor charge efficiency, will also increase the internal pressure of the cell. A good hydrogen storage/hydride electrode as described in U.S. Pat. Nos. 4,849,205 and 5,006,328 have good charging efficiency and a high oxygen recombination rate. Thus, the internal pressure in a sealed cell using these alloys is expected to be low and the cycle life will be longer.

The battery, according to this invention, is composed of a container, a positive electrode, a negative electrode comprising a body of rechargeable hydrogen storage active material and/or the hydride thereof, a separator positioned between the positive and negative electrodes, and electrolyte in the container and in contact with the positive and negative electrodes and the separator.

The negative electrode is composed of a body of a multicomponent hydrogen storage alloy having composition represented by: $A_a B_b Ni_c D_y M_x R_z$ and its hydride thereof; where Ni is the element nickel and other components A, B, D, M and R are defined by: A is at least one element selected from the group consisting of: Ti, Zr and Mg; B is at least one element selected from the group consisting of: Al, V, Mn, Nb, Si, Pd and Ag; D is at least one element selected from the group consisting of: Cr, Mn, Fe, Co, Cu, Zn, Mo, W and Sn; R is at least one element selected from the group consisting of: C, B, Ca, Bi, Sb, Y, Sc, Hf, Ta, N, O, Ge, Ga and Mm, where Mm is mischmetal; M is at least one element selected from the group consisting of Li, Na, K, Rb, Cs, P and S; and where the atomic mole ratios a, b, c, x, y and z are defined by: $0.01 \leq a \leq 0.85$, $0.01 \leq b \leq 0.65$, $0.02 \leq c \leq 0.75$, $0 \leq y \leq 0.30$, $0 \leq x \leq 0.30$, $0 \leq z \leq 0.30$, $a+b+c+x+y+z=1.00$ and the atomic mole ratio of Ti is not greater than a, but is great than zero; and if present, Mm is 0–8.0 at %, O is 0–2.0 at. %, and Mm is 0–15 at. %; preferably, $0.40 \leq a \leq 0.65$, $0.02 \leq b \leq 0.40$, $0.10 \leq c \leq 0.45$, $0 \leq x \leq 0.15$, $0 \leq y \leq 0.15$, $0 \leq z \leq 0.15$; also preferably, Zr is less than 30 at %, if present.

Alternatively, the negative electrode is composed of a body of a hydrogen storage alloy having a composition represented by: $A_a B_b Ni_c D_y Q_p M_x R_z$, and its hydride thereof; where Ni is the element nickel and other components A, B, C, Q, M and R are defined by: A is at least one element selected from the group consisting of: Ti, Zr, and Mg; B is at least one element selected from the group consisting of: V, Mn and Cr; Q is at least one element selected from the group consisting of: Fe, Co, Cu, Zn, Nb, Mo, W, Pd, Ag and Sn; R is at least one element selected from the group consisting of C, B, Ca, Sb, Bi, Sc, Y, Hf, Ta, O, N, Ge, Ga and Mm, where Mm is mischmetal; M is at least one element selected from the group consisting of Li, Na, K, Rb, Cs, P and S; and where the atomic mole ratios a, b, c, y, p, x and z are defined by: $0.10 \leq a \leq 0.85$, $0.01 \leq b \leq 0.65$, $0.02 \leq c \leq 0.75$, $0 \leq y \leq 0.30$, $0 \leq p \leq 0.30$, $0 \leq x \leq 0.30$, $0 \leq z \leq 0.30$ and $a+b+c+x+y+z+p=1.00$ the atomic mole ratio of Ti is not greater than a, but is great than zero; and if present, Mm is 0–8.0 at. %, O is 0–2.0 at. % and Mm is 0–15 at. %, and Al is between 3.0 and 30 at. %; preferably, $0.40 \leq a \leq 0.65$ $0.02 < b < 0.40$, $0.10 \leq c \leq 0.45$, $0 \leq y \leq 0.15$, $0 \leq p \leq 0.15$, $0 \leq x \leq 0.15$, $0 \leq z \leq 0.15$; another preferably, $0.20 \leq a \leq 0.65$, $0.10 \leq b+c \leq 0.30$, $0 \leq y \leq 0.15$, $0 \leq p \leq 0.15$, $0 \leq x \leq 0.15$, $0 \leq z \leq 0.15$; also preferably, Zr is less than 30 at. % and/or $0.07 \leq p+z$.

Alternatively further, the negative electrode is composed of a body of a hydrogen storage alloy selected from the following groups having compositions represented by: $(Ti, Zr)_a(V, Mn)_b Ni_c Mo_y Q_p M_x R_z$ and its hydride thereof; $(Ti, Zr)_a(Nb, Mn)_b Ni_c(Cr, Mo)_y Q_p M_x R_z$ and its hydride thereof; $(Ti, Hf)_a(V, Mn)_b Ni_c Mo_y Q_p M_x R_z$ and its hydride thereof; $(Ti, Zr)_a(V, Mn)_b Ni_c(Cr, Mo)_y Q_p M_x R_z$ and its hydride thereof; where Q is at least one element selected from the group consisting of: Al, Mg, Ca, Si, Co, Fe, Cu, Zn, W, Pd, Ag, Nb and Sn; M is at least one element selected from the group consisting of: Li, Na, K, Rb, Cs, P and S; R is at least one element selected from the group consisting of: Hf, C, B, Sb, Bi, Nb, Sc, Y, Ta, N, O, Ge, Ga and Mm, where Mm is mischmetal; and where the atomic mole ratios, a, b, c, p, x, y, and z are defined by: $0.10 \leq a \leq 0.85$, $0 \leq b \leq 0.45$, $0.02 \leq c \leq 0.75$, $0 \leq y \leq 0.30$, $0 \leq p \leq 0.30$, $0 \leq x \leq 0.30$, $0 \leq z \leq 0.30$, $0 < b+y < 0.65$ and $a+b+c+p+x+y+z=1.00$, the atomic mole ratio of Ti is not greater than a, but is greater than zero; the atomic mole ratios of other components are; Ti plus Zr is a, Ti plus Hf is a, Mn plus V is b, Mn plus Nb is b, Cr plus Mo is y; and if present, Mn is 0–15 at. %, Nb is 0–38 at. %, Mm is 0–8.0 at. % and O is 0–2.0 at. %; preferably $0.30 \leq a \leq 0.65$, $0.02 \leq b \leq 0.40$, $0.10 \leq c \leq 0.45$, $0 \leq y \leq 0.15$, $0 \leq p \leq 0.15$, $0 \leq x \leq 0.15$, and $0 \leq z \leq 0.15$; another preferably, $0.40 \leq a \leq 0.65$, $0.02 \leq b \leq 0.40$, $0.10 \leq c \leq 0.45$, $0 \leq x \leq 0.15$, $0 < y < 0.15$ and $0 \leq z \leq 0.15$, $0 < b+c < 0.52$; further preferably Zr is less than 30 at. %.

Several simple exemplary alloys of the present invention are:

| | |
|---|---|
| "$Ti_{asa'}Zr_{aa'}V_b Ni_c Q_p M_x$; | $Ti_{asa'}Zr_{sa'}Cr_b Ni_c Q_p M_x$; |
| $Ti_{asa'}Zr_{sa'}Cr_{bb'}Mn_{b-bb'}Ni_c Q_p M_x$; | $Ti_s V_{b-bb'}Mn_{bb'}Ni_c Q_p M_x$; |
| $Ti_{asa'}Zr_{sa'}V_{b-bb'}Mn_{bb'}Ni_c Q_p M_x$; | $Ti_{sas}Zr_{sa'}V_b Cr_y Ni_c Q_p M_x$; |
| $Ti_{sas}Zr_{sa'}V_b Mo_y Ni_c Q_p M_x$; | $Ti_{sas}Zr_{sa'}Nb_b Mo_y Ni_c Q_p M_x$; |
| $Ti_{sas}Zr_{sa'}Nb_b Cr_y Ni_c Q_p M_x$; | $Ti_{sas}Zr_{sa'}Ta_b Cr_y Ni_c Q_p M_x$; |
| $Ti_{sas}Zr_{sa'}Ta_b Mo_y Ni_c Q_p M_x$; | $Ti_{sas}Zr_{sa'}V_b W_y Ni_c Q_p M_x$; |
| $Ti_{sas}Zr_{sa'}V_{bb'}Nb_{b-bb'}Cr_y Ni_c Q_p M_x$; | |
| $Ti_{sas}Zr_{sa'}Nb_{b-bb'}Ta_{bb'}Cr_y Ni_c Q_p M_x$; | |
| $Ti_{sas}Zr_{sa'}V_{bb'}Ta_{b-bb'}Cr_y Ni_c Q_p M_x$; | |
| $Ti_a Nb_b Cr_{y-yb'}Mo_{yb'}Ni_c Q_p M_x$; | |
| $Ti_a Ta_{b-bb'}Nb_{bb'}Cr_y Ni_c Q_p M_x$; | $Ti_a Ta_b Cr_{y-yb'}Mo_{yb'}Ni_c Q_p M_x$;" | and the hydrides thereof; where Q is at least one element selected from the group consisting of C, B, Al, Ca, Mg, Si, Nb, Mn, Fe, Co, Cu, Zn, Hf, Mo, W, Pd, Ag, Sb, Bi, Y, Sc, Ta, O, N, Sn and Mm, where Mm is mischmetal, provided that Q does not include elements already given in the given formula; M is at least one element selected from the group consisting of Li, Na, K, Rb, Cs, S and P; and the atomic mole ratios, a, a', b, b', c, p, y and x are defined by: $0.10 \leq a \leq 0.85$, $0 \leq a' \leq 1$, $0 < b < 0.45$, $0 \leq b' \leq 1$, $0.02 \leq c \leq 0.75$, $0 < y < 0.30$, $0 \leq p \leq 0.30$, $0 \leq x \leq 0.30$, $b+y<0.60$, $a+b+y+c+p+x=1.00$, or $a+b+c+p+x=1.00$, and if present, Mn is less than 15 at. %, Mm is 0–8.0 at. % and O is 0–2.0 at. %; wherein preferably, $0.40 \leq a \leq 0.65$, $0 < b \leq 0.40$, $0.10 \leq c \leq 0.45$, $0 < p < 0.15$, $0 < y < 0.15$, $0 \leq x \leq 0.15$; also where preferably $b+c<0.52$, and if present, preferably Co, Fe, and Cr are all between 7.0 and 15 at. %, Mn is between 4.0 and 15 at. %, and Al is between 3.0 and 15 at. %; further preferably, Zr is less than 30 at. % and/or $0.07 \leq p$.

Another useful exemplary alloy of the present invention, which has less than 13 at. % of V or Zr, or greater less than 52 at. % of V+Ni, or greater than 15 at. % of Ti to reduce the cost without sacrificing the performance, is represented by: $Ti_a Zr_{a'}V_{0.13-b}Cr_y Ni_c Q_p M_x$; $Ti_a Zr_{0.13-b}V_q Cr_y Ni_c Q_p M_x$; $Ti_{0.15+a}Zr_{a'}V_q Cr_y Ni_c Q_p M_x$; $Ti_a Zr_{a'}V_{td}Ni_{d-td}Cr_y Q_p M_x$; $Ti_a Zr_{a'v_q}Cr_{y+0.07}Ni_c Q_p M_x$; and the hydrides thereof; where Q is at least one element selected from the group consisting of: C, B, Al, Ca, Mg, Si, Nb, Mn, Fe, Co, Cu, Zn, Hf, Mo, W, Pd, Ag, Sb, Bi, Y, Sc, Ta, O, N, Sn and Mm, where Mm is mischmetal; M is at least one element selected from the group consisting of Li, Na, K, Rb, Cs, S and P; and wherein the atomic mole ratios a, a', b, y, c, p, x, q, t and d are defined by: $0<a<0.65$, $0<a'<0.65$, $0<b<0.13$, $0<y<0.30$, $0.02<c<0.75$, $0 \leq p \leq 0.30$, $0 \leq x \leq 0.15$, $0<q<0.45$, $0<t<1.00$, $0<d<0.42$, the amount of Ti plus Zr is 10–85 at. %, the amount of V plus Ni is less than 52 at. %, and the total amount of atomic mole ratios of Ti, Zr, V, Cr, Ni, Q and M is equal to 1.00; and if present, Mm is 0–8.0 at. %, O is 0–2.0 at. % and Mn is 0–15 at. %; wherein preferably, the amount of Ti plus Zr is 40–65 at. %, $0<y<0.15$, $0 \leq p \leq 0.15$, $0.10 \leq c \leq 0.45$, $0 \leq x \leq 0.08$; also preferably, if present, Fc, and Co are all between 7.0 and 15 at. %, Mn is between 4.0 and 15 at. %, and Al is between 3.0 and 15 at. %; further preferably, Zr is less than 30 at. % and/or $0.07 \leq p$.

The exemplary alloys mentioned above were made and used to make rechargeable hydride cells in according with the method described in the present invention. The cells have high capacity, low internal pressure and long life, up to 500 cycles with about 10–20% degradation.

There are several factors to consider regarding the selection of elements for inclusion in the alloy according to this invention. Among the others, Hong in U.S. Pat. No. 5,006,328 teaches the use of heats of hydride formation and the amount of nickel to make a useful alloy, so that one can control the hydrogen equilibrium pressure, capacity and the electrochemical catalytic property of a hydrogen storage/hydride electrode. For example the inclusion of good hydride formers Ti+Zr from 40 to 85 at. % can reduce the amount of vanadium used and thus reduce the cost. More importantly, it also can provide an alloy having good capacity and a desirable low hydrogen equilibrium pressure, and thus reduces the internal pressure during overcharge in a sealed cell. Alternatively, the limit of b+c to less than 30 at. % will reduce the mount of vanadium and nickel resulting in reduced cost and/or hydrogen pressure. Therefore, a cell made therewith will have high capacity, low internal pressure and long life. The inclusion of hydride former M, especially low cost Nb, can replace the expensive V and also give a better performance. The inclusion of a small amount (0.001 to 0.005 at. %) of oxygen or nitrogen in the alloy in many cases results in surface segregation and therefore enhances the catalytic effect. The inclusion of alkali metal serves as a hydride former as well as an oxygen getter. It also forms soluble oxide during charging/discharging cycles to produce hydroxide such as LiOH which enriches the performance of the cell.

The positive electrode is composed of a body of a metal oxide, preferably nickel oxide. The separator is composed of a porous body of insulator film or thin sheet of organic or inorganic material selected from the group consisting of polyamide (such as nylon), polypropylene, polyethylene, polysulfone, PVC. The thickness of separator is from 0.1 mm to 2.00 mm, preferably from 0.20 mm to 0.50 mm. The electrolyte is composed of alkaline solution, preferably KOH solution with concentration from 20 to 40 wt. % plus 0 to 10 wt. % of LiOH. The container is made of either a metal such as nickel, nickel-plated steel or plastic material such as PVC, polypropylene, polysulfone and polyamide.

Alloys having compositions according to the present invention can be prepared first by mixing proper amounts of the elements or mixing elements with other commercially available master alloys such as nickel-zirconium, nickel-vanadium, ferrovanadium, ferrotitanium, aluminum-vanadium, nickel-niobium, etc., and then melting them in a crucible selected from graphite, alumina, zirconia or water-cooled copper, in an induction or arc furnace under a protective atmosphere selected from inert gas such as argon, hydrogen, nitrogen, hydrocarbon gas and a mixture thereof. The homogeneous molten alloy is poured into a mold to obtain a solid ingot. The mold is made of a material similar to that of the crucible. The alloy ingot made thus can be crushed first by conventional methods such as a press, then the crushed pieces are pulverized to powder by hydriding/dehydriding cycles. Moderate to slightly high temperature of between 100 to 450 degrees Centigrade will accelerate the hydriding/dehydriding processes. The hydrogen storage electrode containing the active material of the present invention is then prepared by a sintered or pasted method with or without one or more powder binders selected from the group consisting of nickel, copper, aluminum, zinc, carbon black, PTFE, CMC, PVA (polyvinyl alcohol), polyox, methylcellulose and hydroxylmethyl cellulose. The sizes of the powder binder are from 0.2 to 150 micrometers, preferably from 0.5 to 50 micrometers. The substrate current collector can be nickel or nickel-plated steel mesh, sponge, or perforated or expanded foil. In case of the sintered method, dried alloy powder having size of from 100 mesh to 400 mesh, with or without the powder binders aforementioned, is pressed with a pair of rollers onto the substrate to form the preliminary electrode which is then heated, under vacuum or a protective atmosphere such as argon, nitrogen, hydrocarbon gas, hydrogen or a mixture thereof, at temperatures of from 200 to 1100 degrees Centigrade for 10 to 60 minutes; preferably, at temperatures of from 450 to 950 degree Centigrade for 10 to 20 minutes. In the case of the pasted method, the alloy powder having sizes of from 100 mesh to 400 mesh is mixed with one or more of the aforementioned powder binders and pure water to make a paste or slurry. Then the paste or slurry is pressed onto the substrate current collector with pasting, printing or doctor blade method. The resulting wet hydrogen storage hydride electrode is then dried at temperatures of from 60 to 300 degrees Centigrade for 20 to 90 minutes under vacuum or a protective atmosphere selected from the group consisting of argon, nitrogen, hydrocarbon, hydrogen or the combination thereof. The dried hydrogen storage electrode, if necessary, can be treated with a weak acidic solution with a pH value between 3 and 7, preferably 5.5 to 6.5, at temperatures of between 20 to 120 degrees Centigrade for 5 to 60 minutes, preferably at between 45 to 85 degrees Centigrade for 15 to 30 minutes. In this case, the electrode then is subjected to washing and drying processes. The electrode made thus has an electrochemical capacity of from 1.15 to 2.40 AH/cc and is ready to be used as a negative electrode.

A suitable size of the negative electrode is cut to combine with a matching size of the metal oxide positive electrode having an electrochemical capacity of from 0.45 to 0.75 AH/cc. The positive electrode active material at least comprises a metal oxide, preferably a nickel oxide plus 1–15 wt. % cobalt oxide. To ensure high efficiency, 1–15 wt. % of fine conductive powder selected from the group consisting of nickel, copper, carbon, zinc and aluminum and combinations thereof, is added during the preparation of slurry or paste of the positive electrode. The separator is cut of a similar size and is placed between the negative and positive electrodes to electrically separate them. The separator is a porous thin sheet selected from polyamide such as nonwoven nylon, polypropylene and polysulfone. Finally, an electrolyte is added to complete an electrochemical cell (battery).

There is another factor to make a better battery, especially a sealed battery. It is the N/P ratio, the electrochemical capacity ratio between the negative and positive electrodes. The battery, according to the present invention, has an N/P ratio of between 1.0 to 2.0, preferably 1.10 to 1.45. An N/P ratio of less than 1.0 will result in hydrogen evolution at the negative hydride electrode in early stages of charging without fully charging the positive electrode. Therefore, the cell will have a higher internal pressure and also a low working potential during discharging and a shortened life. An N/P ratio higher than 2.0 will result in the negative electrode not fully charging and low working potential.

Figure 2:
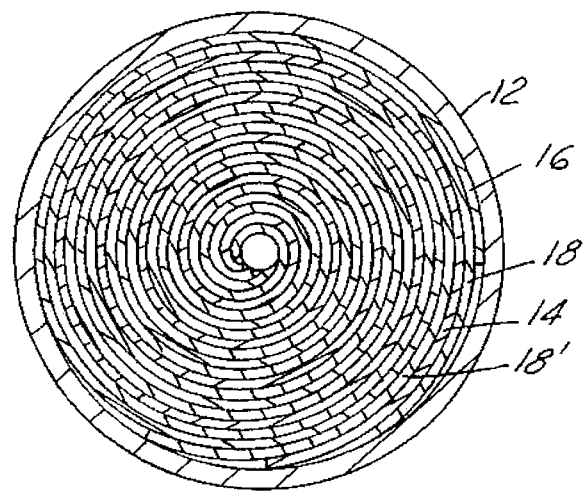
FIG. 2 is a sectional view of the battery according to the present invention, seen along line 2—2 in FIG. 1.

An exemplification of a hydride battery according to the present invention is depicted in FIGS. 1 and 2. In this regard, a sealed metal oxide-hydride battery 10 is composed of a container in the form of an exterior casing 12, a positive electrode 14, a negative (hydride) electrode 16 and a separator 18 disposed between the positive and negative electrodes. In this regard, the negative electrode 16, positive electrode 14 and the separator 18 are mutually spirally wound, as shown in FIG. 2. A cover 20 is sealably connected with the casing 12, and is provided with a resealable safety vent 22. An electrically insulating member 24 separates the cover 20 from the casing 12. A first tab 26 is connected with the positive electrode 14. The first tab 26 is mounted to the casing 12 by an electrically insulating member 24' and is also connected with the cover 20, resulting in the cover being the positive terminal 28 of the battery 10. A second tab is connected with the bottom 32 of the casing, making the bottom the negative terminal 34 of the battery 10. Before the cover 20 is sealed with respect to the casing 12, a suitable amount of electrolyte is placed within the casing. For example, the casing 12 and cover 20 is a suitable conductive metal, the positive electrode 14 is sheet nickel hydroxide, the negative electrode 16 is a sheet of $A_aB_bNi_cD_yM_xR_z$ hydrogen storage material and/or its hydride thereof according to the present invention, the separator 18 is sheet nylon, and the electrolyte is a KOH+LiOH aqueous solution.

In operation, as shown in Equations 1 and 2, during charging hydroxide ions pass through the separator, via the electrolyte from the negative electrode to the positive electrode and water molecules pass through the separator, via the electrolyte, from the positive electrode to the negative electrode. During discharge, wherein a load is placed across the positive and negative terminals, water molecules pass through the separator, via the electrolyte, from the negative electrode to the positive electrode and hydroxide ions pass through the separator, via the electrolyte, from the positive electrode to the negative electrode.

EXAMPLE 1

In according with the present invention, an active material of negative electrode, $Ti_{0.25}Zr_{0.17}Hf_{0.01}V_{0.08}Cr_{0.06}Ni_{0.39}Zn_{0.04}$ and a sintered hydrogen storage/hydride electrode thereof were made. A suitable size of this negative electrode was cut. According to the present invention, a matching nickel positive electrode and nylon separator were provided to make a rechargeable C-size sealed nickel-hydride cell. The N/P ratio was 1.25. The electrolyte was 6 cc of 30 wt % KOH+5% LiOH aqueous solution. The cell was very easy to activate. The cell was charged to 1.50 V at 0.2 c-rate and discharged to 1.0 V. The capacity was up to 3.8 AH at a 3 A current within three cycles. It was cycled to 325 times without significant degradation.

EXAMPLE 2

In according with the present invention, an active material of negative electrode, $Ti_{0.20}Zr_{0.22}Nb_{0.07}Ni_{0.37}Cr_{0.06}Mn_{0.07}Sn_{0.01}$ and a pasted hydrogen storage/hydride electrode thereof were made. A suitable size of this negative electrode was cut. According to the present invention, a matching sintered nickel positive electrode and nylon separator were provided to make a rechargeable C-size sealed nickel-hydride cell. The N/P ratio was 1.50. The electrolyte was 6.50 cc of 30 wt. % KOH+5% LiOH aqueous solution. The cell was easy to activate. The cell was charged to 1.50 V at 0.2 C-rate and discharged to 1.0 V. The capacity was up to 4.0 AH at 0.3 C-rate. It was cycled 258 times and no significant degradation was observed.

EXAMPLE 3

In according with the present invention, an active material of negative electrode, $Ti_{0.25}Zr_{0.18}V_{0.08}Mo_{0.03}Ni_{0.39}Cr_{0.03}Cu_{0.04}$ and a sintered hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The N/P ratio was 1.30. The electrolyte was 2.0 cc of 32 wt. % KOH+10% LiOH aqueous solution. The cell was easy to activate. It was charged to 1.50 V at 0.2 C-rate and discharged to 1.0 V. The capacity was up to 1220 mAH at 0.3 C-rate. It was cycled 357 times without significant degradation.

EXAMPLE 4

In according with the present invention, an active material of negative electrode, $Ti_{0.16}Zr_{0.27}V_{0.11}Ni_{0.38}Al_{0.03}Cr_{0.03}Ta_{0.02}$ and a pasted hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The N/P ratio was 1.45. The electrolyte was 1.8 cc of 30 wt. % KOH+5% LiOH aqueous solution. The cell was charged to 1.50 V at 0.2 C-rate and discharged to 1.0 V. The capacity was up to 1185 mAH at a 1.0 A current. After 450 cycles, less than a 10% capacity drop was observed.

To those skilled in the art to which this invention appertains, the above described preferred embodiments may be subjected to change or modification. Such change or modification can be carried out without departing from the scope of the invention, which is intended to be limited only by the scope of the appended claims.

What is claimed is:

1. A method for making a high capacity rechargeable hydride battery comprising the steps of:

(1) preparing a hydrogen storage material and its hydride electrode thereof as a negative electrode, wherein said negative electrode comprises: a hydrogen storage material selected from the group having a composition formula:

$A_aB_bNi_cD_yM_xR_z$ and its hydride thereof;

where A is at least one element selected from the group consisting of Ti, Zr and Mg; B is at least one element selected from the group consisting of Al, V, Mn, Si, Pd, and Ag; D is at least one element selected from the group consisting of Cr, Fe, Co, Cu, Zn, Nb, Mo, W, and Sn; R is at least one element selected from the group consisting of C, B, Ca, Sb, Bi, Sc, Y, Hf, Ta, O, N, Ge, Ga, and Mm, where Mm is mischmetal; M is at least one element selected from the group consisting of Li, Na, K, Rb, Cs, P, and S; and where the atomic mole ratios, a, b, c, x, y and z are defined by: $0.10 \leq a \leq 0.85$, $0.01 \leq b \leq 0.65$, $0.02 \leq c \leq 0.75$, $0 \leq x \leq 0.30$, $0 < y \leq 0.30$, $0 < x < 0.30$, $a+b+c+x+y+z=1.00$, and the atomic mole ratio of Ti is not greater than a, but is greater than zero; and if present, Mm is 0–8.0 at. %, O is 0–2.0 at. % and Mn is 0–15 at. %; and Zr is less than 30 at. %;

wherein said step of preparing comprises homogeneously melting said component elements of said hydrogen storage material in a crucible selected from graphite, zirconia, alumina and water-cooled copper under less than 1 atm, protective atmosphere selected from inert gas, hydrogen, hydrocarbon gas and combinations thereof, wherein said negative hydrogen storage electrode is prepared by sintering under vacuum at 450°–950° C. without binder, or with one or more powder binders selected from the group of copper, aluminum, zinc, carbon black, PTFE, polyox, and methylcellulose;

(2) preparing a positive metal oxide electrode having an electrochemical capacity from 0.45 to 0.75 AH/cc, wherein said positive electrode comprising a nickel oxide plus 1–15 wt. % cobalt oxide and 1–15 wt. % of conductive powder selected from the group consisting of Ni, Cu, C, Zn, Al, and combinations thereof; wherein said N/P ratio, the electrochemical capacity ratio of said negative electrode to said positive electrode, is between 1.0 and 2.0;

(3) providing a separator selected from the group consisting of polyamide, polypropylene and polysulfone;

(4) providing an electrolyte;

(5) providing a container; and (6) assembling a rechargeable hydride battery, comprising the steps of: placing said separator between said negative and positive electrodes; placing said separator and said positive and negative electrodes in said container; and placing said electrolyte in said container in contact with said negative and positive electrodes and with said separator.

2. The method of claim 1, wherein B is at least one element selected from the group consisting of Al, Mn and Si; R is at least one element selected from the group consisting of B, Sb, Bi, Sc, Hf, O, N, Ge, and Ga.

3. A battery made in accordance with the method of claim 1, wherein B is at least one element selected from the group consisting of Al, Mn, and Si; R is at least one element selected from the group consisting of B, Sb, Bi, Sc, Hf, O, N, Ge, and Ga.

4. A battery of claim 1, wherein $0.40 \leq a \leq 0.65$, $0.02 \leq b \leq 0.40$, $0.10 \leq c \leq 0.45$, $0 \leq x \leq 0.15$, $0 < y \leq 0.15$, $0 < z \leq 0.15$.

5. A battery made in accordance with the method of claim 1, wherein D is at least one element selected from the group consisting of Fe, Co, Cu, Zn, Nb, Mo, and Sn; R is at least one element selected from the group consisting of B, Bi, Sb, Sc, and Hf.

6. A method of claim 1, wherein a substrate current collector for said hydrogen storage electrode is nickel or nickel plated steel selected from the group consisting of nickel or nickel-plated steel: mesh, sponge, perforated foil, and expanded foil.

7. A method of claim 1, wherein said hydrogen storage electrode has an electrochemical capacity from 1.15 to 2.40 AH/cc.

8. A method for making a high capacity rechargeable hydride battery comprising the steps of:

(1) preparing a hydrogen storage material and its hydride electrode, wherein said negative electrode comprises a hydrogen storage material selected from the group having a composition formula:

$A_a B_b Ni_c D_y Q_p M_x R_z$ and it hydride thereof;

where A is at least one element selected from the group consisting of Ti, Zr and Mg; B is at least one element selected from the group consisting of V, Mn, and Cr; D is Al and/or Si; Q is at least one element selected from the group consisting of: Fe, Co, Cu, Zn, Nb, Mo, W, Pd, Ag and Sn; R is at least one element selected from the group consisting of: C, B, Ca, Sb, Bi, Sc, Y, Hf, Ta, O, N, Ge, Ga and Mm, where Mm is the mischmetal; M is at least one element selected from the group consisting of Li, Na, K, Rb, Cs, P and S; where the atomic mole ratio, a, b, c, p, x, y and z are defined by: $0.10 < a < 0.85$, $0.01 < b < 0.65$, $0.02 < c < 0.75$, $0 < y < 0.30$, $0 < p < 0.30$, $0 \leq x < 0.30$, $0 < z < 0.30$, $a+b+c+y+p+x+z=1.00$, and the atomic mole ratio of Ti is not greater than a, but is greater than zero; and if present, Mm is 0–8.0 at. %, Mn is 0–15.0 at. %, O is 0–2.0 at. %, and Al is between 3.0 and 30 at. %, Zr is less than 30 at. %; and wherein said step of preparing comprises homogeneously melting elements of said hydrogen storage material in a crucible selected from graphite, zirconia, alumina and water-cooled copper under less than 1 atm. protective atmosphere selected from inert gas, hydrogen, hydrocarbon gas and combinations thereof; wherein said negative hydrogen storage electrode is prepared by sintering under vacuum at 450°–950° C. without binder, or with one or more powder binders selected from the group of copper, aluminum, zinc, carbon black, PTFE, polyox, and methylcellulose;

(2) preparing a positive metal oxide electrode having an electrochemical capacity from 0.45 to 0.75 AH/cc, wherein said positive electrode comprises a nickel oxide plus 1–15 wt. % cobalt oxide and 1–15 wt. % of conductive powder selected from the group consisting of Ni, Cu, C, Zn, Al and combination thereof; wherein said N/P ratio, the electrochemical capacity of said negative electrode to said positive electrode, is between 1.0 and 2.0;

(3) providing a separator selected from the group consisting of polyamide, polypropylene and polysulfone;

(4) providing an electrolyte;

(5) providing a container; and (6) assembling a rechargeable hydride battery, comprising the steps of: placing said separator between said negative and positive electrodes; placing said separator and said positive and negative electrodes in said container; and placing said electrolyte in said container in contact with said negative and positive electrodes and with said separator.

9. The method of claim 8, wherein B is at least one element selected from the group consisting of Mn, and Cr; R is at least one element selected from the group consisting of B, Sb, Bi, Sc, Hf, O, N, Ge, and Ga.

10. A battery made in accordance with the method of claim 8, wherein B is at least one element selected from: V and Mn, R is at least one element selected from the group consisting of B, Sb, Bi, Sc, Hf, O, N, Ge, and Ga.

11. A battery of claim 10, wherein $0.40 < a \leq 0.65$, $0.02 \leq b \leq 0.40$, $0.10 \leq c \leq 0.45$, $0 < y < 0.15$, $0 < p < 0.15$, $0 \leq x < 0.15$, $0 < z \leq 0.15$.

12. A battery of claim 10, wherein $0.20 \leq a \leq 0.65$, $0.10 \leq b+c \leq 0.30$, $0 < y < 0.15$, $0 < p < 0.15$, $0 \leq x < 0.15$, $0 < z \leq 0.15$.

13. A battery made in accordance with the method of claim 8, wherein B is at least one element selected from: Mn and Cr, R is at least one element selected from the group consisting of B, Sb, Bi, Sc, Hf, O, N, Ge, and Ga.

14. A method of claim 8, wherein a substrate current collector for said hydrogen storage electrode is nickel or nickel plated steel selected from the group consisting of nickel or nickel-plated steel: mesh, sponge, perforated foil, and expanded foil.

15. A method of claim 8, wherein said hydrogen storage electrode has an electrochemical capacity from 1.15 to 2.40 AH/cc.

16. A hydride battery, wherein said battery comprises a hydrogen storage hydride negative electrode comprising hydrogen storage and hydride material selected from the group having a composition represented by:

$Ti_{a-aa'} Zr_{aa'} V_b Ni_c Q_p M_x$, and its hydride thereof;

$Ti_{a-aa'} Zr_{aa'} Cr_b Ni_c Q_p M_x$, and its hydride thereof;

$Ti_{a-aa'} Zr_{aa'Crbb'} Mn_{b-bb'} Ni_c Q_p M_x$, and its hydride thereof;

$Ti_a V_{b-bb'} Mn_{bb'} Ni_c Q_p M_x$, and its hydride thereof;

$Ti_{a-aa'} Zr_{aa'} V_{b-bb'} Mn_{bb'} Ni_c Q_p M_x$, and its hydride thereof;

where Q is at least one element selected from the group consisting of B, Zn, Hf, W, Sb, Bi, Sc, O, N, and Sn; M is at least one element selected from the group consisting of Li, Na, K, Rb, Cs, S and P; and the atomic mole ratios a, a', b, b', c, y, p and x are defined by: $0.10 < a < 0.85$, $0 < a' < 1$, $0 < b < 0.45$, $0 < b' < 1$, $0.02 < c < 0.75$, $0 < p < 0.30$, $0 \leq x < 0.30$, $a+b+c+p+x=1.00$, $b+c < 0.52$, and if present, Mn is less than 15 at. %, O is 0–2.0 at. %, and Zr is less than 30 at. %; wherein said the hydrogen storage electrode is prepared by a sintering or a pasting method;

wherein said battery further comprises a metal oxide positive electrode having an electrochemical capacity from 0.45 to 0.75 AH/cc; and wherein said N/P ratio, the electrochemical capacity ratio of said negative electrode to said positive electrode, is between 1.0 and 2.0.

17. A battery of claim 16, wherein Q is at least one element selected from the group consisting of B, Zn, Hf, W, Sb and Sn.

18. A battery of claim 17, wherein $0.40 \leq a \leq 0.65$, $0 < b < 0.40$, $0.10 \leq c \leq 0.45$, $0.07 < y < 0.15$, $0 < p \leq 0.15$, $0 \leq x \leq 0.15$.

19. A hydrogen storage and hydride material of claim 16, wherein Q is one or more element selected from the group of B, Zn, Hf, W, Sb, and Sn.

20. A method for making a rechargeable hydride battery comprising the steps of:

(1) preparing a hydrogen storage material and the hydride electrode thereof as a negative electrode, wherein said negative electrode comprising: a hydrogen storage material selected from the group having a composition formula:

$Ti_{a-aa'} Zr_{aa'} V_b Ni_c Q_p M_x$, and its hydride thereof;

$Ti_{a-aa'} Zr_{aa'} Cr_b Ni_c Q_p M_x$, and its hydride thereof;

$Ti_{a-aa'} Zr_{aa'Crbb'} Mn_{b-bb'} Ni_c Q_p M_x$, and its hydride thereof;

$Ti_aV_{b-bb'}Mn_{bb'}Ni_cQ_pM_x$, and its hydride thereof;

$Ti_{a-aa'}Zr_{aa'}V_{b-bb'}Mn_{bb'}Ni_cQ_pM_x$, and its hydride thereof;

where Q is at least one element selected from the group consisting of C, B, Al, Ca, Mg, Si, Nb, Mn, Fe, Co, Cu, Zn, Hf, Mo, W, Pd, Ag, Sb, Bi, Y, Sc, Ta, O, N, Sn and Mm, where Mm is mischmetal, provided that Q does not include elements already given in the given formula; M is at least one element selected from the group consisting of Li, Na, K, Rb, Cs, S and P; and the atomic mole ratios a, a', b, b', c, y, p and x are defined by: $0.10<a<0.85$, $0<a'<1$, $0<b<0.45$, $0\leq b'\leq 1$, $0<y<0.30$, $0.02<c<0.75$, $0<p<0.30$, $0\leq x\leq 0.30$, $b+c<0.52$; $a+b+c+p+x=1.00$, and if present, Mn is less than 15 at. %, Mm is 0–8.0 at. %, and O is 0–2.0 at. %, and Zr is less than 30 at. %; wherein said step of preparing comprises homogeneously melting said elements of said hydrogen storage material in a crucible selected from graphite, zirconia, alumina and water-cooled copper under 1 atm. protective atmosphere selected from inert gas, hydrogen, hydrocarbon gas and combinations thereof; wherein said hydrogen storage electrode is prepared by sintering under vacuum at 450°–950° C. without binder, or with one or more powder binders selected from the group of copper, aluminum, zinc, carbon black, PTFE, polyox, and methylcellulose;

(2) preparing a positive metal oxide electrode having electrochemical capacity from 0.45 to 0.75 AH/cc, wherein said positive electrode comprising a nickel oxide plus 1–15 wt. % cobalt oxide and 1–15 wt. % of conductive powder selected from the group consisting of Ni, Cu, C, Zn, Al and combination thereof; and wherein said N/P ratio, the electrochemical capacity ratio of said negative electrode and said positive electrode, is between 1.0 and 2.0;

(3) providing a separator selected from the group consisting of polyamide, polypropylene, and polysulfone;

(4) providing an electrolyte;

(5) providing a container; and (6) assembling a rechargeable hydride battery, comprising the steps of: placing said separator between said negative and positive electrodes; placing said separator and said positive and negative electrodes in said container, and placing said electrolyte in said container in contact with said negative and positive electrodes and with said separator.

21. A material for hydrogen storage and hydride electrode selected from the group having a composition represented by:

$Ti_{a-aa'}Zr_{aa'}V_bMo_yNi_cQ_pM_x$;

$Ti_{a-aa'}Zr_{aa'}Nb_bCr_yNi_cQ_pM_x$;

$Ti_{a-aa'}Zr_{aa'}Ta_bMo_yNi_cQ_pM_x$;

$Ti_{a-aa'}Zr_{aa'}Nb_{b-bb'}Ta_{bb'}Cr_yNi_cQ_pM_x$;

$Ti_{a-aa'}Zr_{aa'}Ta_{b-bb'}V_{bb'}Cr_yNi_cQ_pM_x$;

$Ti_aNb_bCr_{y-yb'}Mo_{yb'}Ni_cQ_pM_x$;

$Ti_aTa_{b-bb'}Nb_{bb'}Cr_yNi_cQ_pM_x$;

$Ti_{a-aa'}Zr_{aa'}Nb_bMo_yNi_cQ_pM_x$;

$Ti_{a-aa'}Zr_{aa'}Ta_bCr_yNi_cQ_pM_x$;

$Ti_{a-aa'}Zr_{aa'}V_bW_yNi_cQ_pM_x$;

$Ti_aTa_bCr_{y-yb'}Mo_{yb'}Ni_cQ_pM_x$;

where Q is at least one element selected from the group consisting of B, Zn, Hf, W, Sb, Bi, Sc, Sn, O, and N; M is at least one element selected from the group consisting of Li, Na, K, Rb, Cs, S and P; and the atomic mole ratios a, a', b, b', c, y, p, and x are defined by $0.10<a<0.85$, $0\leq a'<1$, $0<b<0.45$, $0\leq b'<1$, $0<y<0.30$, $0.02<c<0.75$, $0<p<0.30$, $0\leq x\leq 0.30$, $b+y<0.60$; $a+b+y+c+p+x=1.00$, and if present Zr is less than 30 at. %.

22. A material of claim 21, wherein Q is B, Zn, Hf, and Sn.

23. A hydride battery, wherein said battery comprises a hydrogen storage hydride negative electrode comprising a hydrogen storage alloy selected from the group having a composition represented by formula:

$Ti_aZr_aV_{0.13-b}Cr_yNi_cQ_pM_x$, and its hydride thereof;

$Ti_aZr_{0.13-b}V_qCr_yNi_cQ_pM_x$, and its hydride thereof;

$Ti_{a+0.15}Zr_aV_qCr_yNi_cQ_pM_x$, and its hydride thereof;

$Ti_aZr_aV_{td}Ni_{d-td}Cr_yQ_pM_x$, and its hydride thereof;

where Q is at least one element selected from the group consisting of C, B, Ca, Al, Mg, Si, Nb, Mn, Fe, Co, Cu, Zn, Hf, Mo, W, Pd, Ag, Sb, Bi, Y, Sc, Ta, O, N, Sn and Mm, where Mm is mischmetal; M is at least one element selected from group consisting of Li, Na, K, Rb, Cs, S and P; and wherein the atomic mole ratios, a, a', b, y, c, p, x, q, t and d are defined by: $0<a<0.65$, $0<a'<0.65$, $0<b<0.13$, $0<y<0.30$, $0.02<c<0.75$, $0\leq p\leq 0.30$, $0<x<0.15$, $0<q<0.45$; $0<t<1.00$, $0<d<0.42$, the amount of Ti plus Zr is 10–85 at. %, the amount of V plus Ni is less than 52 at. %, and the total amount of atomic mole ratios of Ti, Zr, V, Cr, Ni, Q, and M is 1.00; and if present, Mm is 0–8.0 at. %, O is 0–2.0 at. % and Mn is 0–15 at. %; wherein said battery further comprises a metal oxide positive electrode, wherein said N/P ratio, the electrochemical capacity ratio of said negative electrode and said positive electrode, is between 1.0 and 2.0.

24. A battery of claim 23, wherein the amount of Ti plus Zr is 45–65 at. %; and $0.10\leq c\leq 0.45$, $0<y<0.15$, $0<p<0.15$, $0<x\leq 0.08$.

25. At battery of claim 23, wherein Q is at least one element selected from the group consisting of C, Mn, Cu, Si, Zn, Fe, Al, Mo, Nb, Hf, O and Mm, where Mm is mischmetal; and M is one or more elements selected from the group of Li, Na, K and P.

26. A hydrogen storage hydride electrode of claim 23.

27. The hydride battery according to claim 23 wherein said hydrogen storage alloy is represented by:

$Ti_{0.25}Zr_{0.17}Hf_{0.01}V_{0.08}Cr_{0.06}Ni_{0.39}Zn_{0.04}$.

28. A hydride battery, wherein said battery comprises a negative electrode comprising a hydrogen storage/hydride material selected from the groups having a composition represented by the formula:

$Ti_{sas'}Zr_{ss'}V_bCr_yNi_cQ_pM_x$;

$Ti_{sas'}Zr_{sa'}V_bMo_yNi_cQ_pM_x$;  $Ti_{sas'}Zr_{ss'}Nb_bMo_yNi_cQ_pM_x$;

$Ti_{sas'}Zr_{sa'}Nb_bCr_yNi_cQ_pM_x$;  $Ti_{sas'}Zr_{sa'}Ta_bCr_yNi_cQ_pM_x$;

$Ti_{sas'}Zr_{ss'}Ta_bMo_yNi_cQ_pM_x$;  $Ti_{sas'}Zr_{ss'}V_bW_yNi_cQ_pM_x$;

$Ti_{sas'}Zr_{aa'}V_{bb'}Nb_{b-bb'}Cr_yNi_cQ_pM_x$;

$Ti_{sas'}Zr_{sa'}Nb_{b-bb'}Ta_{bb'}Cr_yNi_cQ_pM_x$;

$Ti_{sas'}Zr_{ss'}Ta_{b-bb'}V_{bb'}Cr_yNi_cQ_pM_x$;

$Ti_aNb_bCr_{y-yb'}Mo_{yb'}Ni_cQ_pM_x$;

$Ti_aTa_{b-bb'}Nb_{bb'}Cr_yNi_cQ_pM_x$;  $Ti_aTa_bCr_{y-yb'}Mo_{yb'}Ni_cQ_pM_x$;

where Q is at least one element selected from the group consisting of B, Al, Mg, Si, Nb, Mn, Fc, Co, Cu, Zn, Hf, Mo, W, Pd, Ag, Sb, Bi, Y, Sc, Ta, Sn, O, N, and Mm, where Mm is mischmetal; M is at least one element selected from the group consisting of Li, Na, K, Rb, Cs, S and P; and the atomic mole ratios a, a', b, b', c, y, p, and x are defined by: $0.10<a<0.85$, $0\leq a'<1$, $0<b<0.45$, $0<b'<1$, $0<y<0.30$, $0.02<c<0.75$, $0\leq p<0.30$, $0<x\leq 0.30$, $b+y<0.60$; $a+b+y+c+$ p+x=1.00, and if present, Mm is 0–8.0 at. %, Mn is less than 15 at. %, O is 0–2.0 at. %; wherein said battery further comprises a metal oxide positive electrode having an electrochemical capacity from 0.45 to 0.75 AH/cc, wherein said N/P ratio, the electrochemical capacity ratio of said negative electrode and said positive electrode, is between 1.0 and 2.0.

29. A battery of claim 28, wherein $0.40 \leq a \leq 0.65$, $0 < y < 0.15$, $0.10 \leq c \leq 0.45$, $0 \leq p \leq 0.15$.

30. A hydrogen storage hydride material of claim 28, wherein Q is at least one element selected from the group of B, Al, Si, Nb, Mn, Fe, Co, Cu, Hf, W, Sb, Sn and Mm.

31. A battery of claim 28, wherein said hydrogen storage hydride material is selected from the groups having a composition represented by the formula:

$Ti_{a-aa'}Zr_{aa'}Nb_b Cr_y Ni_c Q_p M_x$;
$Ti_{a-aa'}Zr_{aa'}Nb_{b-bb'}V_{bb'}Cr_y Ni_c Q_p M_x$;
$Ti_{a-aa'}Zr_{aa'}Nb_{b-bb'}Ta_{bb'}Cr_y Ni_c Q_p M_x$.

32. The hydride battery according to claim 28 wherein M is at least one element selected from the group consisting of Li, Na, K, and Rb, and $0 < x < 0.15$.

* * * * *